United States Patent
Wood et al.

[19]

[11] Patent Number: 6,163,441
[45] Date of Patent: Dec. 19, 2000

[54] RESONANCE DAMPENING ACTUATOR BEARING ASSEMBLY

[75] Inventors: Roy L. Wood, Yukon; John D. Stricklin, Oklahoma City; Nigel F. Misso, Bethany, all of Okla.

[73] Assignee: Seagate Technology LLC, Scotts Valley, Calif.

[21] Appl. No.: 09/134,495

[22] Filed: Aug. 14, 1998

Related U.S. Application Data

[60] Provisional application No. 60/075,729, Feb. 24, 1998.

[51] Int. Cl.⁷ ............................................... G11B 5/55
[52] U.S. Cl. ............................................... 360/266.1
[58] Field of Search ............................ 360/265.7, 265.9, 360/266.1, 265.6; 384/535–536

[56] References Cited

U.S. PATENT DOCUMENTS

| | | | |
|---|---|---|---|
| 4,447,493 | 5/1984 | Driscoll et al. | 428/332 |
| 5,315,465 | 5/1994 | Blanks | 360/106 |
| 5,491,598 | 2/1996 | Stricklin et al. | 360/106 |
| 5,930,071 | 7/1999 | Back . | |
| 6,038,105 | 3/2000 | Wood et al. | 360/106 |

*Primary Examiner*—George J. Letscher
*Attorney, Agent, or Firm*—Crowe & Dunlevy

[57] ABSTRACT

An improved pivot mechanism for a disc drive actuator assembly, the actuator assembly having an E-block which supports an array of read/write heads in reading and writing data relationship to a plurality of data discs, the actuator assembly having a bearing cartridge that rotatably supports the E-block and is receivingly disposed within a bore of the E-block and fixed therein by a tolerance ring interposed in the bore between the bearing cartridge and the E-block. The bearing cartridge has a hollow sleeve that supports the tolerance ring on an outer diameter thereof, and furthermore supports a damping member on the inner diameter thereof. The damping member is attached to the sleeve by a selected damping material.

16 Claims, 5 Drawing Sheets

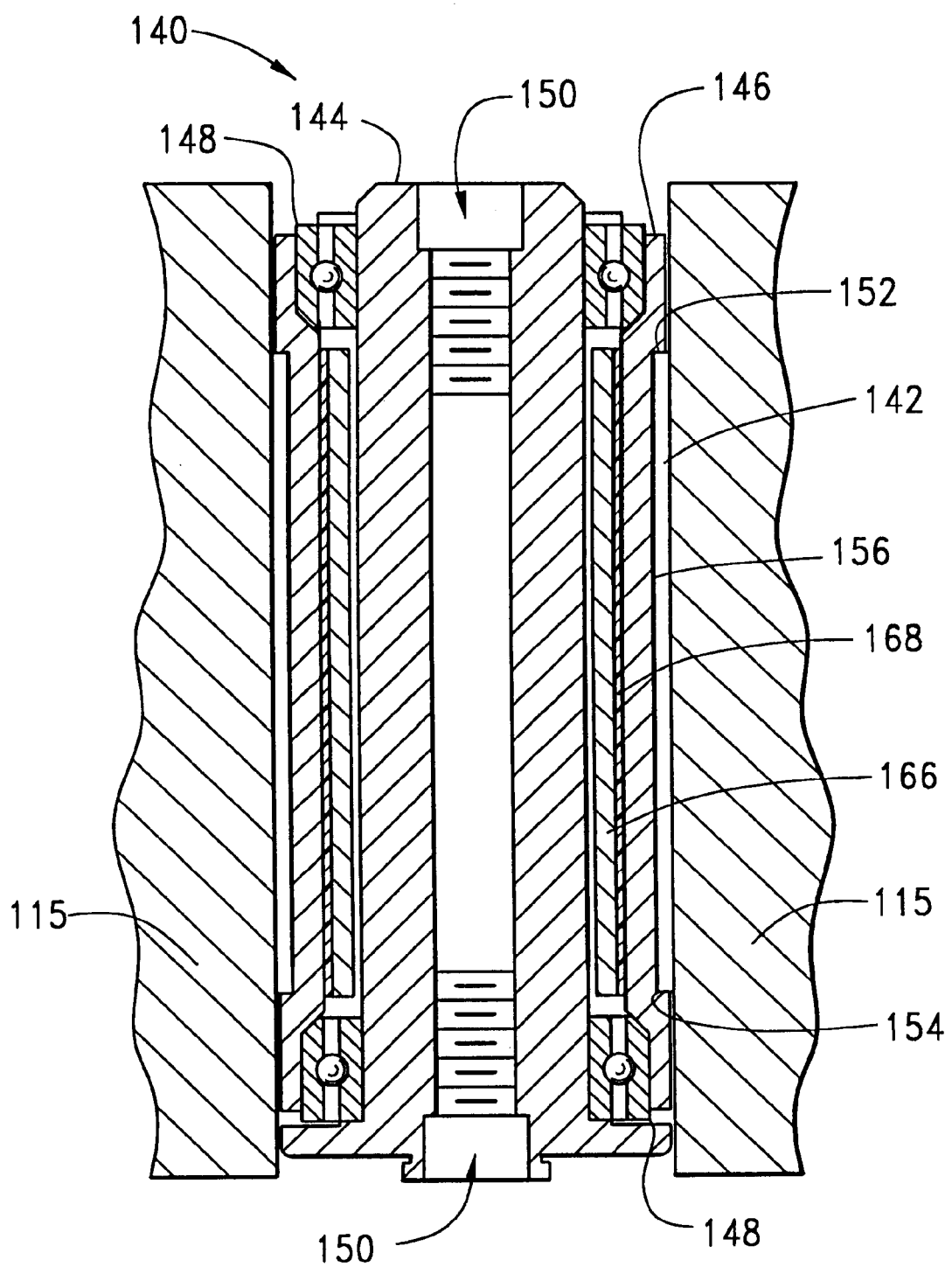
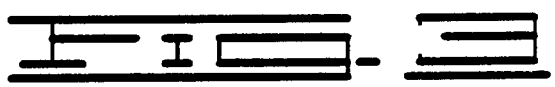

RESONANCE DAMPENING ACTUATOR BEARING ASSEMBLY

RELATED APPLICATIONS

This application claims the benefit of United States Provisional Application No. 60/075,729 entitled MASS DAMPER ACTUATOR BEARING CARTRIDGE, filed Feb. 24, 1998.

FIELD OF THE INVENTION

The present invention relates generally to the field of disc drive data storage devices, and more particularly but not by way of limitation, to an improved bearing assembly for the actuator of a disc drive.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by the read/write heads which are mounted on a complementary stack of actuator arms which form a part of an actuator assembly. The actuator assembly generally includes head wires which conduct electrical signals from the read/write heads to a flex circuit which, in turn, conducts the electrical signals to a flex circuit connector mounted to a disc drive base deck.

When the disc drive is not in use, the read/write heads are parked in a position separate from the data storage surfaces of the discs. Typically, a landing zone is provided on each of the disc surfaces where the read/write heads are positioned before the rotational velocity of the spinning discs decreases below a threshold velocity which sustains the air bearing. The landing zones are generally located near the inner diameter of the discs.

Generally, the actuator assembly has an actuator body that pivots about a pivot mechanism disposed in a medial portion thereof. A motor, such as a voice coil motor, selectively positions a proximal end of the actuator body. This positioning of the proximal end in cooperation with the pivot mechanism causes a distal end of the actuator body, which supports the read/write heads, to move radially across the face of the discs. The function of the pivot mechanism is crucial in meeting performance requirements associated with the positioning of the actuator assembly. A typical pivot mechanism has two ball bearings with a stationary shaft attached to an inner race and a sleeve attached to an outer race. The sleeve is also attached within a bore in the actuator body. The stationary shaft typically is attached to the base deck and the top cover of the disc drive.

The pivotal support of the actuator assembly upon a set of ball bearings presents problems associated with resonance being transmitted to the supporting arms of the read/write heads and thus inducing position error signals into the servo feedback loop.

A solution to the resonance problem is to provide a rigid mounting of the actuator body to a rotational portion of the pivot mechanism and a mass damper attached to the rotational portion. The combination of mass dampening and rigid joinder of the bearing assembly effectively satisfies a long felt need in the industry for an improved pivot mechanism which dampens the resonance response of the actuator assembly.

SUMMARY OF THE INVENTION

The present invention is directed to a disc drive having a resonance dampening bearing assembly. In a preferred embodiment, the bearing assembly rotatably supports an actuator assembly, the actuator assembly supporting an array of read/write heads in data reading and writing relationship to a plurality of discs having data recording surfaces. A rigid mounting of the actuator assembly in conjunction with a mass damper provides improved resonance response of the actuator assembly.

The actuator assembly has a centrally disposed E-block member which has a plurality of actuator arms at a distal end which support the read/write heads. The E-block furthermore supports a voice coil at a proximal end in cooperative relationship with a magnet assembly of the disc drive to pivot the E-block about the bearing assembly to move the read/write heads radially across the discs.

The bearing assembly has a bearing cartridge with a stationary shaft supported by a base deck and top cover of the disc drive. A hollow sleeve member is separated from the stationary shaft by a pair of ball bearings that rotatably support the sleeve about the stationary shaft.

The outer surface of the sleeve has a groove which supports a tolerance ring compressingly interposed between the E-block and the sleeve within a bore in the E-block to provide a rigid connection therebetween. Together the bearing cartridge and tolerance ring are press-fitted in the bore. A viscoelastic damping material joins a damping member to the inner surface of the sleeve. The damping member and damping material provide a dampening of the frequency response of the actuator assembly.

The advantages and features of the present invention will be apparent from the following description when read in conjunction with the drawings and appended claims.

BRIEF DESCRIPTION OF THE DRAWINGS

FIG. 3 is a partial sectional view of the bearing assembly of FIG. 2.

DETAILED DESCRIPTION

Figure 1:
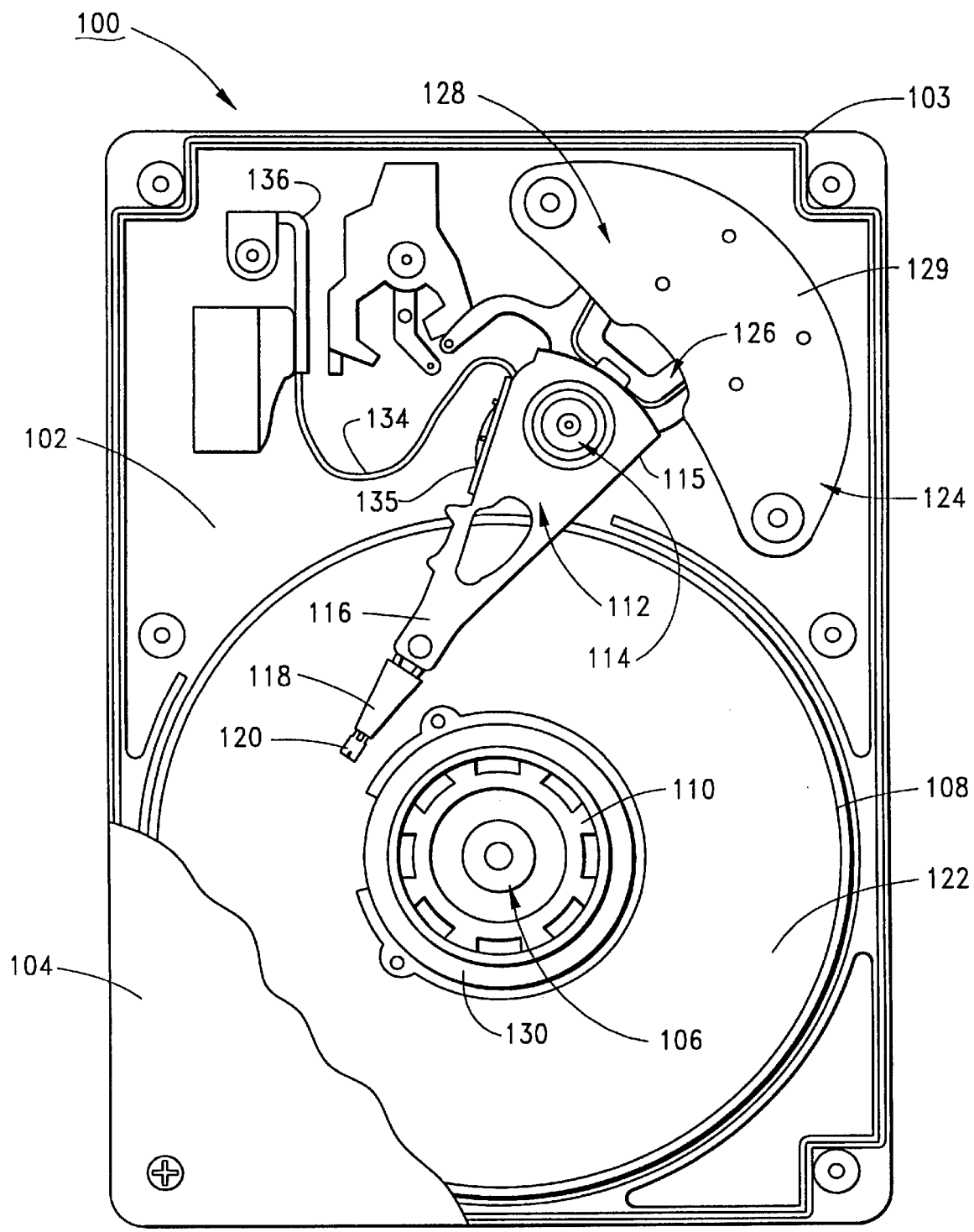
FIG. 1 is a top view of a disc drive constructed in accordance with the present invention.

Referring to the drawings in general, and more particularly to FIG. 1, shown therein is a top view of a disc drive 100 constructed in accordance with a preferred embodiment of the present invention. The disc drive 100 includes a base deck 102 to which various disc drive components are mounted, and a top cover 104, which together with the base deck 102 and a perimeter gasket 103 provide a sealed internal environment for the disc drive 100. The top cover 104 is shown in a partial cut-away fashion to expose selected components of interest. It will be understood that numerous details of construction of the disc drive 100 are not included in the following description, as such, they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which pivots about a bearing assembly 114 in a rotary fashion. The actuator assembly 112 includes an E-block 115 that is supported by the bearing assembly 114. The E-block 115 has actuator arms 116 (only one shown) that support load arm assemblies 118. The load arm assemblies 118 in turn support read/write heads 120, with each of the heads 120 adjacent a surface of one of the discs 108. As mentioned hereinabove, each of the discs 108 has a data recording surface 122 divided into concentric circular data tracks (not shown), and the heads 120 are positionably located adjacent data tracks to read data from, or write data to, the tracks.

The actuator assembly 112 is controllably positioned by a voice coil motor assembly (VCM) 124, comprising an actuator coil 126 immersed in the magnetic field generated by a magnet assembly 128. A magnetically permeable flux path, such as a steel plate 129, is mounted above the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the magnet assembly 128 in accordance with the well-known Lorentz relationship. As the actuator coil 126 moves, the actuator assembly 112 pivots about the bearing assembly 114, causing the actuator arms 116 to move the heads 120 adjacent to, and across, the discs 108. Located near the inner clamp ring 110 are parking surfaces 130, the parking surfaces 130 being non-data surfaces that are designated areas where the heads 120 come to rest when the disc drive 100 becomes non-operational, the provision of the parking surfaces 130 preventing the heads 120 from damaging any data storage locations.

To provide the requisite electrical conduction paths between the heads 120 and disc drive read/write circuitry (not shown), head wires (not separately shown) are routed on the actuator assembly 112 from the heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit 134 is connected to a flex circuit bracket 136 in a conventional manner, which, in turn, is connected through the base deck 102 to a disc drive PCB (not shown) mounted to the underside of the base deck 102. The disc drive PCB provides the disc drive read/write circuitry which controls the operation of the heads 120, as well as other interface and control circuitry for the disc drive 100.

Figure 2:
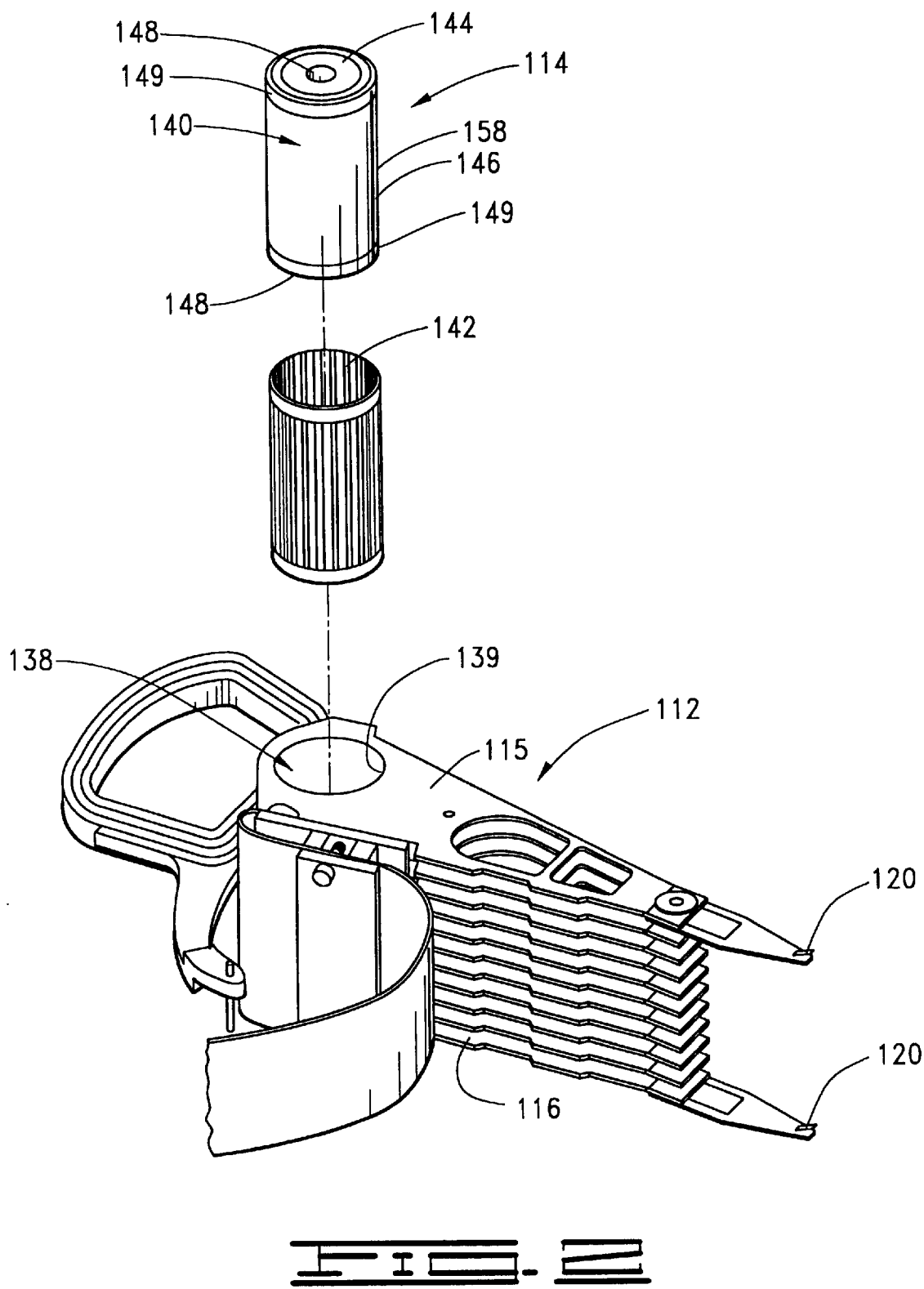
FIG. 2 is an exploded perspective view of the actuator assembly and the bearing assembly of the disc drive of FIG. 1.

Turning now to FIG. 2, shown therein is a perspective, partially exploded view of the actuator assembly 112 and the bearing assembly 114. The E-block 115 forms a bore 138 which receivingly engages the bearing assembly 114 along a bore surface 139. The bearing assembly 114 includes a bearing cartridge 140 and a tolerance ring 142 compressingly interposed between the bearing cartridge 140 and the bore surface 139 to retain the bearing cartridge 140 within the bore 138..

FIG. 3 shows the bearing cartridge 140 has a stationary shaft 144 and an outer sleeve 146 separated at upper and lower ends thereof by a pair of ball bearings 148. The stationary shaft 144 has openings 150 on both ends to receive fasteners (not shown) for attachment of the stationary shaft 144 to the base deck 102 and to the top cover 104. In a preferred embodiment the openings 150 are internally threaded openings to receive screw members. In this manner it will be understood that the stationary shaft 144 is rigidly supported by the base deck 102 and the top cover 104 and the sleeve 146 rotates thereabout the stationary shaft 144.

The sleeve 146 of the bearing cartridge 140 forms an upper shoulder 152 and a lower shoulder 154, and a groove 156 of a reduced diameter therebetween the shoulders 152, 154. The tolerance ring 142 is seated in the groove 156 before the bearing cartridge 140 is placed into the bore 138.

Figure 4:
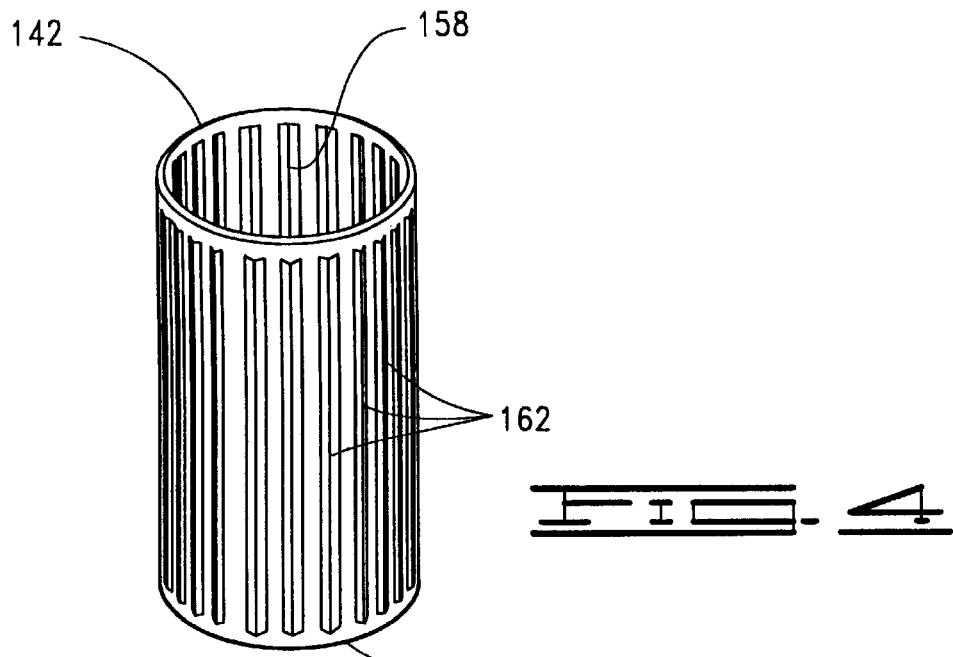
FIG. 4 is a perspective view of the tolerance ring of the actuator assembly of FIG. 2.

FIG. 4 shows the tolerance ring 142 is a split ring member which forms a cylindrical inner surface 158 and a cylindrical outer surface 160, with a plurality of projecting corrugations 162 forming a corrugated surface on the inner surface 158 and the outer surface 160. The tolerance ring 142 is of a type such as is manufactured by RENCOL, the Ray Engineering Company, of Great Britain.

Figure 5:
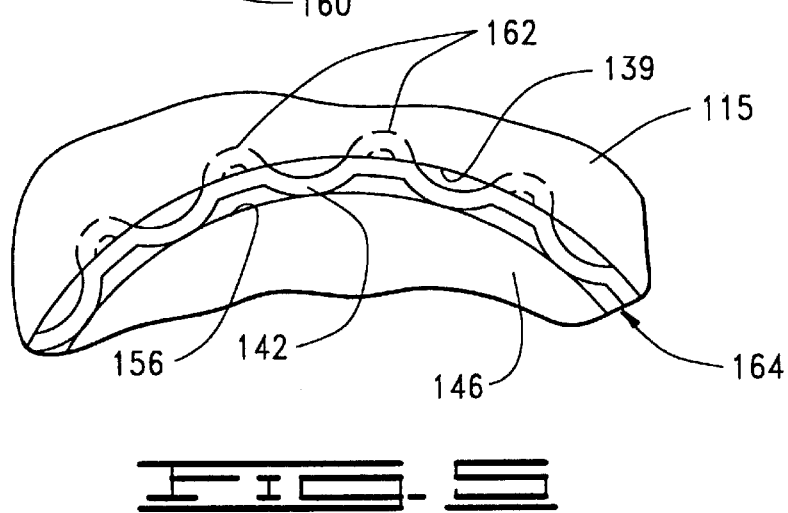
FIG. 5 is a partial sectional view of a portion of the E-block and the bearing assembly showing the compressed tolerance ring therebetween.

It will be understood from FIG. 5 that the tolerance ring 142 is sandwiched between the groove 156 of the sleeve 146 and the bore surface 139 of the E-block 115. The sleeve 146 and tolerance ring 142 combine to provide an effective outer diameter that is greater than the bore 139 inner diameter. As such, the sleeve 146 and tolerance ring 142 combination can be press fit into the bore by press fit methodology well known by one skilled in the art. The press fit compresses the corrugations 162 as shown in FIG. 5 where the broken lines denote the shape of the corrugations 162 before insertion into the E-block 115.

The compression imparted to the corrugations 162 of the tolerance ring 142 creates sufficient frictional resistance to retain the bearing cartridge 140 within the bore 138, preventing displacement of the sleeve 146 relative to the E-block 115 in both the axial and radial directions. In this manner it will be generally understood that the tolerance ring 142 effectively fills a gap 164 between the sleeve 146 and the E-block 115 to fixedly attach the actuator assembly 112 for rotation.

The pivotal attachment of the E-block 115 subjects the actuator assembly 112 to operational resonance. The frequency and magnitude of the vibrations are in part dependent on the selected radial stiffness of the ball bearings 148 and the applied preload to the ball bearings 148 used in the bearing cartridge 140. A bearing cartridge 140 with ball bearings 148 that have a relatively low stiffness and/or low preload offers less rotational friction and associated resonance, but at a cost of increased resonance from translational forces produced by the VCM 124 in repositioning the actuator assembly 112. A bearing cartridge 140 with ball bearings 148 that have a relatively high stiffness and/or low preload offers superior resistance to resonance from translational forces of the VCM 124, but the stiffer bearing increases the resonance associated with the rolling friction of the bearing cartridge 140.

A way of reducing the resonance in the actuator assembly 112 is to use a practical pre-load on each ball bearing 148 and provide a vibration damper having a mass proportionately matched to the stiffness of the bearing cartridge 140 to dampen the resonance. This allows the use of a relatively low friction ball bearing 148 which enhances other operational factors such as power dissipation and speed with which the actuator assembly 112 is repositioned. This solution furthermore permits tuning the system resonance by proportionately matching the mass of the damper to the stiffness of the ball bearings 148, so as to control the resonant frequency of the actuator assembly 112. In this manner it is generally advantageous to minimize the amplitude of resonant frequencies within the bandwidth of operation of the servo system, otherwise the resonance can create false head position error signals to the servo.

Figure 6:
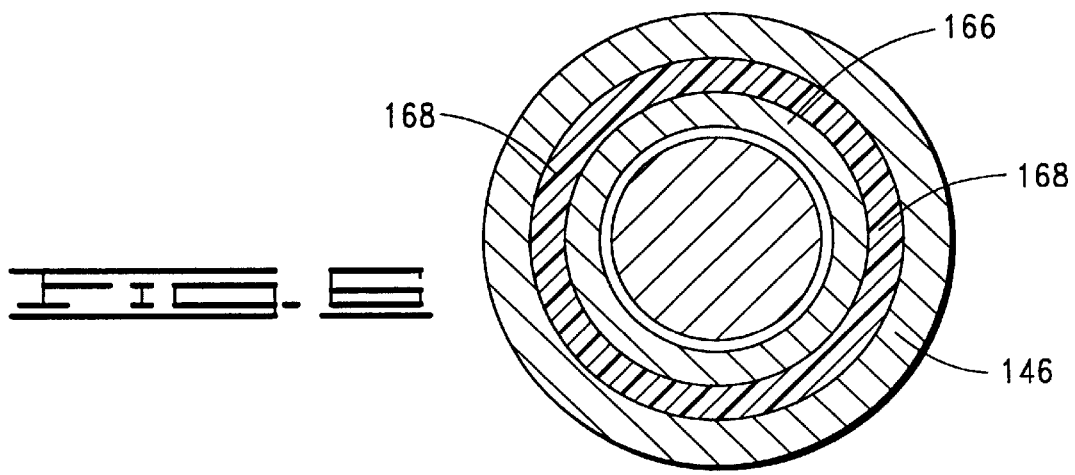
FIG. 6 is a partial sectional view of the bearing cartridge of the bearing assembly.

Returning to FIG. 3, it will be noted a damping member 166 is attached to the sleeve 146 by a damping material 168. The damping member 166 is disposed internally within the bearing cartridge 140 between the stationary shaft 144 and the sleeve 146, and between the bearings 148. FIG. 6 is a partial sectional view showing the damping material 168 joins the sleeve 146 to the ring-shaped damping member 166. Note that the characteristic shape of the damping member 166 is such that clearance is provided with respect to the stationary shaft 144, and with respect to the bearings 148 (see FIG. 3) so as to not impede the rotational freedom of the sleeve 146. Note also that in a preferred embodiment the characteristic shapes of the damping member 166 and the damping material 168 are symmetric about the axis of rotation, so as to not unbalance the rotary load of the actuator assembly 112.

In a preferred embodiment the damping material 168 is made of a viscoelastic material such as the material manufactured by DuPont and commercially recognized by the trade name VAMAC, otherwise known as ethylene acrylic. In addition to the favorable viscoelastic characteristics, VAMAC has outgassing characteristics that are suitable for use within the bearing cartridge 140 of a disc drive assembly.

In a preferred embodiment the damping member 166 is made of a dense material, such as tungsten alloy, so as to minimize the size needed to achieve the desired mass for a selected system resonance. The damping member 166 is preferably formed by metal injection molding which provides superior tolerance control. Other equivalent processes are known to be available, such as sintering and extruding.

One skilled in the art will recognize many advantages of the present invention which result in minimizing an inertial response of the actuator assembly 112. The damping member 166, by being mounted to the sleeve 146, is thus located as closely as possible to the stationary shaft 144 which thereby minimizes the moment of inertia of the added mass. The construction of the damping member 166 and the damping material 168 are symmetrical about the stationary shaft 144 to prevent the creation of a rotating mass concentration. Because the preferred embodiment described above uses a longitudinally split tolerance ring 142, to the extent that the tolerance ring 142 is properly sized to have abutting edges when disposed about the bearing cartridge 140, the method of attaching the bearing cartridge 140 to the E-block 115 by way of the tolerance ring 142 adds mass that is substantially symmetrical about the stationary shaft 144 to likewise prevent the creation of a rotating mass concentration.

In constructing the bearing cartridge 140, in one preferred embodiment the damping member 166 and the sleeve 146 are positioned as inserts in an appropriate injection molding die, which provides a gap 164 between the components. The damping material 168 is then injected into portions of the gap 164 to join the damping member 166 to the sleeve 146. The sleeve 146 can then be assembled to the remaining components of the bearing cartridge 140.

In another preferred embodiment the damping material 168 is formed as a sleeve and installed in the sleeve 146. The damping member 166 is then press-fitted into the damping material 168 to form a sleeve 146 damping member 166 sub assembly. The shaft 144 is then placed within the sleeve 146 and the bearings 148 are pressed between the shaft 144 and the sleeve 146.

Figure 7:
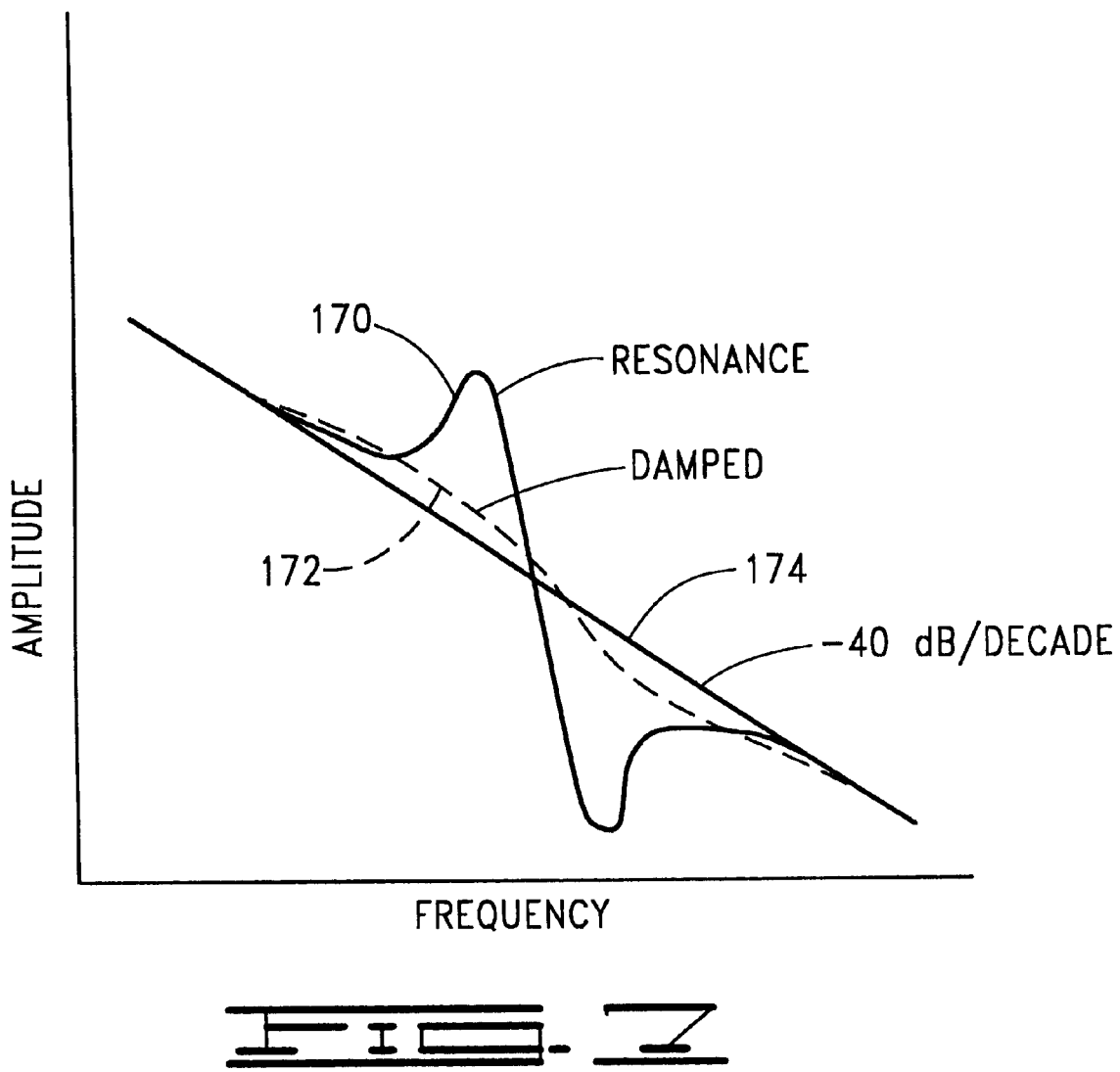
FIG. 7 is a graphical representation of the resonance dampening effect of the present invention on the actuator assembly.

FIG. 7 graphically illustrates the resonance dampening effect of the present invention on an actuator assembly. The solid line 170 represents the resonance response of a prior art disc drive and the broken line 172 represents the system response of a comparable disc drive modified in accordance with the present invention. The prior art response characteristically has a sharp rise followed by a severe dip in comparison to an otherwise classic −40 dB/decade second order response, shown at 174. The present invention thus provides a construction that effectively dampens this resonant spike making the resonant response stable across the frequency range.

One skilled in the art will recognize the advantages of the damped system response provided by the present invention and illustrated in FIG. 7 include a substantial elimination of resonance within the bandwidth of the servo system operation. The damped resonance is in part manifested as a damped radial oscillation during data track seek operations which results in improved track settle performance. The damped resonance is furthermore manifested as an energy absorption feature during non-cyclic forces such as actuator slamming and external shocks and vibrations.

The present invention provides an improved actuator assembly (such as 112) for a disc drive (such as 100), the actuator assembly having an E-block body (such as 115) that is rotatably supported on a bearing cartridge (such as 140) and joined thereto by a compressingly inserted tolerance ring (such as 142) between the bearing cartridge and the E-block. The bearing cartridge has a stationary shaft (such as 144) which is adapted to receive fasteners for attachment to a base deck (such as 102) and a top cover (such as 104) of the disc drive. The stationary shaft rotatably supports a sleeve (such as 146) with a pair of ball bearings (such as 148) interposed therebetween. The sleeve has a groove (such as 156) which supports the tolerance ring on an outer surface thereof, and which cooperates with an appropriately sized bore (such as 139) in the E-block to provide a compression of the tolerance ring when the bearing cartridge is press-fitted into the bore to achieve an interference fit of the bearing cartridge in the bore.

The sleeve supports a damping member (such as 166) on an inner surface of the sleeve. The damping member is joined to the sleeve by a damping material (such as 168). In a preferred embodiment the damping member is located adjacent the sleeve and the damping material is injected therebetween for joinder. The damping material provides a viscoelastic connection of the damping member to the sleeve, and thus a mechanical connection to the E-block for resonance dampening.

It is to be understood that even though numerous characteristics and advantages of various embodiments of the present invention have been set forth in the foregoing description, together with details of the structure and function of various embodiments of the invention, this disclosure is illustrative only, and changes may be made in details especially in matters of structure and arrangement of parts within the principles of the present invention to the full extent indicated by the broad general meaning of the terms in which the appended claims are expressed.

What is claimed is:

1. An actuator for a disc drive, comprising:
   an E-block forming a central supporting body;
   a bore centrally displaced within the E-block;
   a plurality of arms supported by the E-block;
   an array of read/write heads supported by the arms;
   a coil supported by the E-block;
   a bearing cartridge disposed in the bore of the E-block, the bearing cartridge comprising:
      a stationary shaft;
      a bearing supported by the shaft;
      a circular sleeve encasing the stationary shaft and rotatably supported by the bearing for rotation about the stationary shaft; and
      a circular damping member circumferentially supported by an inner surface of the sleeve and encased within the circular sleeve and encasing the shaft for damping resonant frequencies of the E-block; and
   a tolerance ring interposed between the bearing cartridge and the E-block to secure the bearing cartridge within the bore.

2. The actuator of claim 1 wherein the circular sleeve comprises a groove for circumferentially housing the tolerance ring.

3. The actuator of claim 2 wherein the tolerance ring has an inner surface pressingly engaging the groove, and an outer surface engaging the bore surface, the inner surface and outer surface forming a plurality of projecting corrugations.

4. The actuator of claim 3 wherein the damping member is attached to the sleeve by a circular damping material comprising a viscoelastic polymer.

5. The actuator of claim 4 wherein the viscoelastic polymer comprises ethylene acrylic.

6. The actuator of claim 5 wherein the damping member comprises tungsten alloy.

7. The actuator of claim 4 wherein the damping material is injected between the damping member and the sleeve.

8. The actuator of claim 4 wherein the damping material is formed of a sleeve of material interposed between the damping member and the sleeve.

9. In a disc drive assembly having a base deck, a spindle motor supported by the base deck, a disc connected to the spindle motor for rotation and having a data surface, and a cover which cooperates with the base deck to provide a sealed enclosure, an actuator assembly comprising:
   an E-Block having a bore;
   a bearing cartridge supported by the base deck and cover; the bearing cartridge comprising:
      a stationary shaft;
      a bearing supported by the shaft;
      a circular sleeve encasing the stationary shaft and rotatably supported by the bearing for rotation about the stationary shaft; and
      a circular damping member circumferentially supported by the sleeve for damping resonant frequencies of the E-block; and
   a tolerance ring interposed between the bearing cartridge and the E-block to secure the bearing cartridge within the bore.

10. The apparatus of claim 9 wherein the circular sleeve comprises a groove for circumferentially housing the tolerance ring.

11. The apparatus of claim 10 wherein the tolerance ring has an inner surface pressingly engaging the groove, and an outer surface engaging the bore surface, the inner surface and the outer surface forming a plurality of projecting corrugations engaging the bore surface.

12. The apparatus of claim 11 wherein the damping member is attached to the sleeve by a circular damping material comprising a viscoelastic polymer.

13. The apparatus of claim 12 wherein the viscoelastic polymer is ethylene acrylic.

14. The apparatus of claim 13 wherein the damping member comprises tungsten alloy.

15. The actuator of claim 12 wherein the damping material is injected between the damping member and the sleeve.

16. The actuator of claim 12 wherein the damping material is formed of a sleeve of material interposed between the damping member and the sleeve.

* * * * *